Sept. 17, 1968      A. V. KLANCNIK      3,401,833
MACHINE TOOLS
Filed July 8, 1966                              2 Sheets-Sheet 1
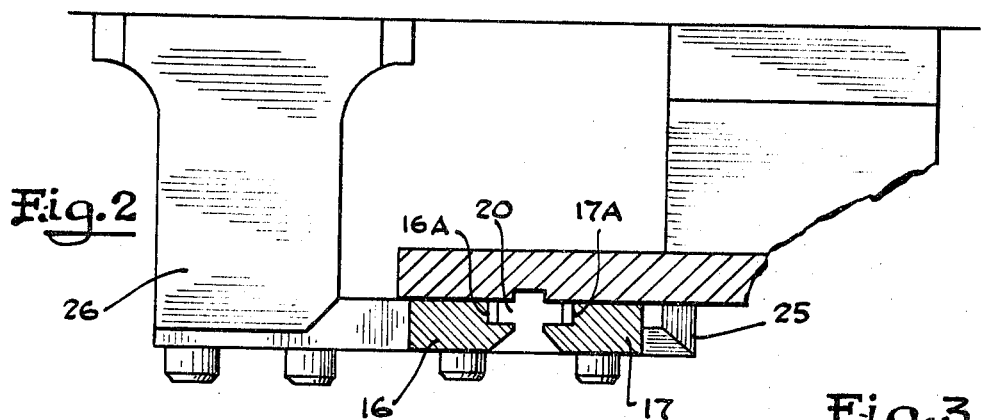
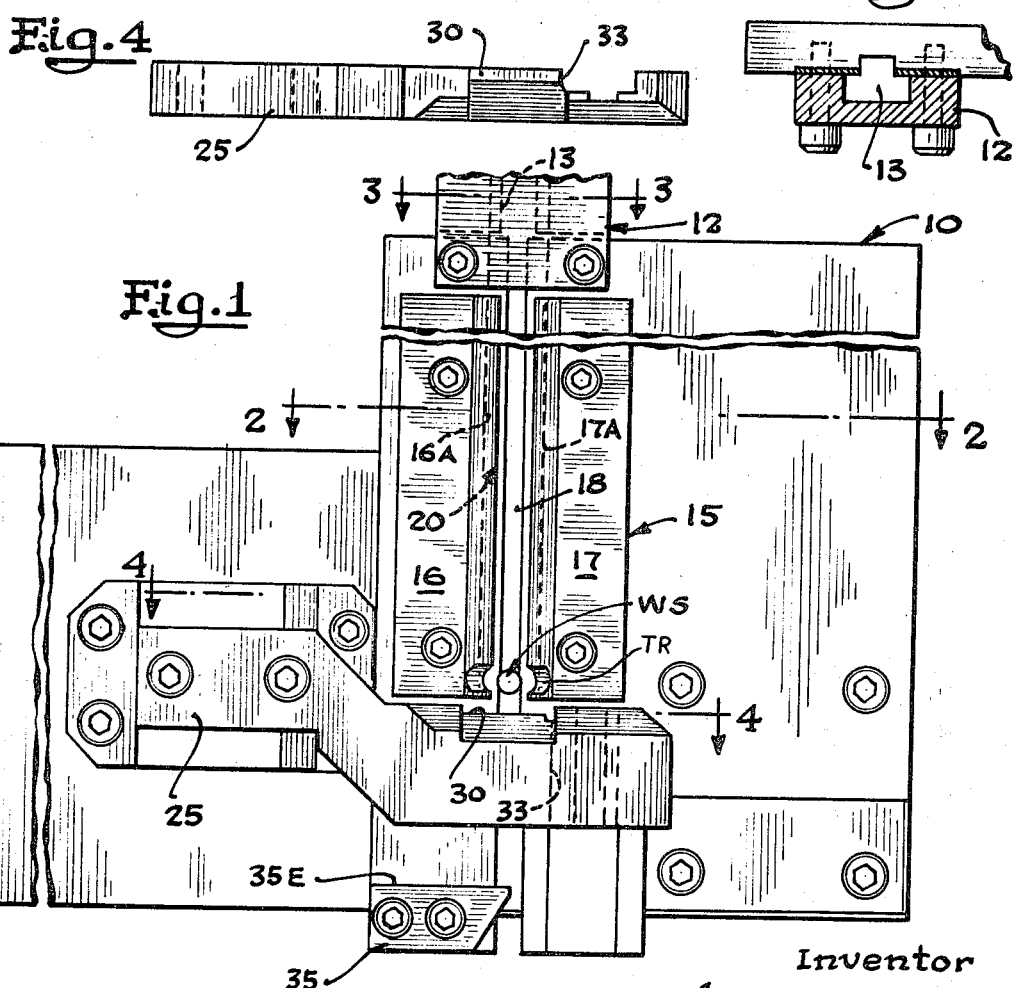
Inventor
Adolph V. Klancnik
By Wallace, Kinzer and Dom
Attorneys

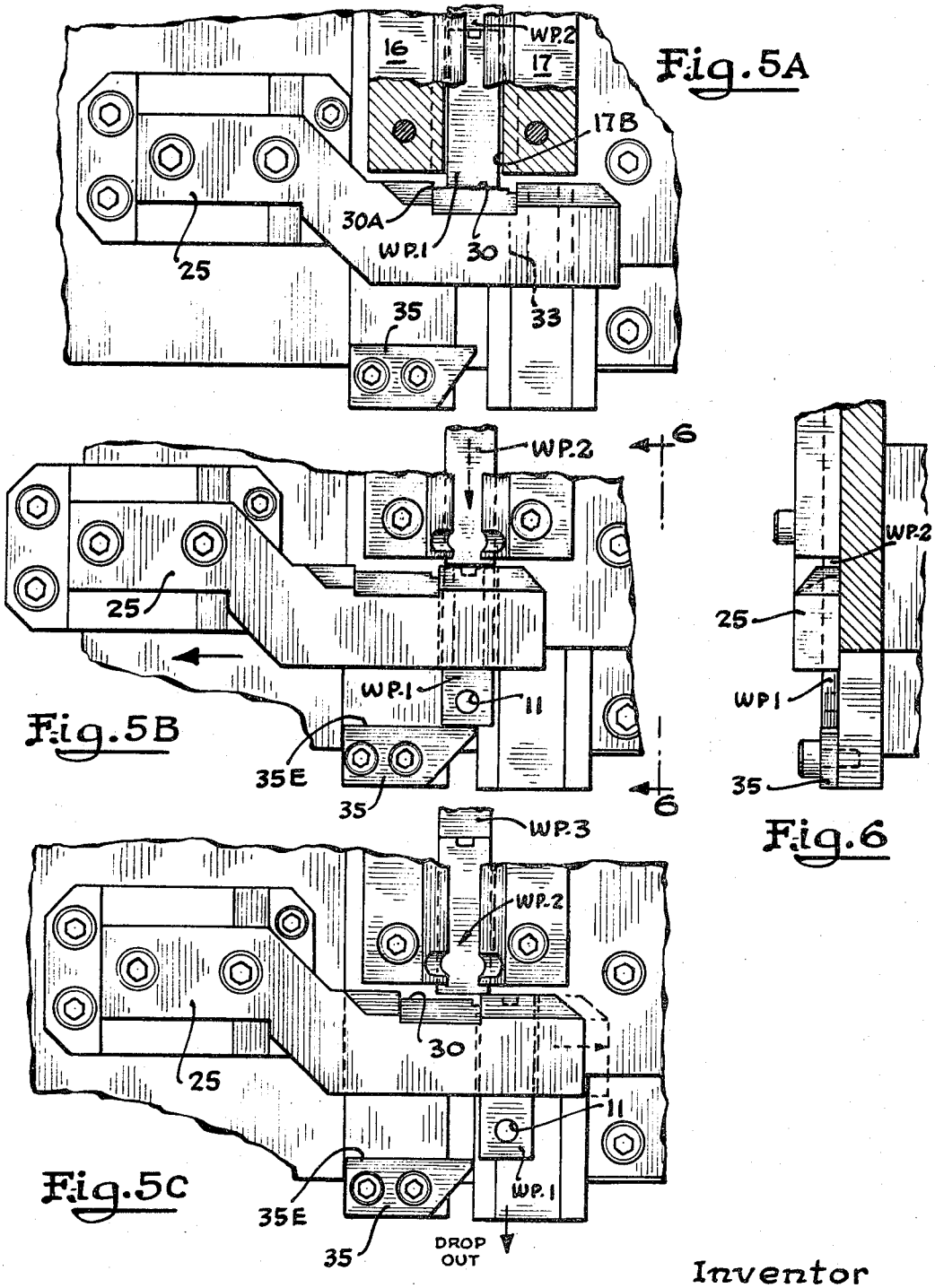

United States Patent Office 3,401,833
Patented Sept. 17, 1968

3,401,833
MACHINE TOOLS
Adolph V. Klancnik, 1020 Glenview Road,
Glenview, Ill. 60025
Filed July 8, 1966, Ser. No. 563,894
1 Claim. (Cl. 221—268)

ABSTRACT OF THE DISCLOSURE

A reciprocal work piece supporting and work piece releasing jaw in a machine tool is so configured and operated as to afford the following functions: In its supporting position, a supporting shoulder on the jaw supports the lowermost work piece in a guideway, in position to be worked on; in its releasing position a gate or slot in the jaw presents the finished work piece to a stop, while the finished work piece at the same time supports the next work piece; and as the jaw returns from its releasing to its supporting position, the finished work piece is moved off the stop with the next work piece eventually reposing on the support shoulder of the jaw.

---

This invention relates to a positioning fixture or work holder for a machine tool of the character typified by the machine tools in United States Patents Nos. 3,001,422, 3,091,363 and 3,109,557 which are specifically adapted for performing operations such as tapping, threading, drilling, counterboring, pointing, facing and countersinking on relatively small work pieces.

Machine tools of this kind are designed by me to operate at a relatively high speed, and in pursuance of this the arrangement is such that the work pieces are fed at a high rate one-by-one to the work station where a reciprocating tool is effective to perform the intended operation. I have now found that an even higher rate of production can be achieved by using a single movable jaw or work holder, not only to locate the work piece at the work station for the intended operation, but also to release the finished work piece while controlling the feeding of a new work piece to the work station, and so to do constitutes the primary object of the present invention.

Specifically, the object of the present invention is to increase production rates in machine tools of the above kind and to expedite handling of work pieces by constructing the movable jaw element to present both a work piece support and a work piece release gate, so that in the supporting position of the jaw a work piece is presented to the tool for the intended machining operation, while in the releasing position of the jaw the same work piece, in its finished state, is released from the work station; then, as the jaw moves toward its supporting position, the finished work piece is delivered by the jaw, and at the same time the next work piece is eased into the working station by the jaw.

In this manner, the jaw performs at least three different functions, and, as will be explained, can be easily modified to conform to work pieces of variant shape.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawing:

FIG. 1 is an elevational view, partly broken away, of a machine tool incorporating the present invention;

FIGS. 2 and 3 are sectional views respectively on the lines 2—2 and 3—3 of FIG. 1;

FIG. 4 is a plan view of the movable jaw, being taken on the line 4—4 of FIG. 1;

FIGS. 5A, 5B and 5C are fragmentary views, similar to FIG. 1, showing various positions of the movable jaw; and FIG. 6 is a view on the line 6—6 of FIG. 5B.

The present invention is illustrated as embodied in a machine tool 10, FIG. 1, which may be of the general character disclosed in my aforesaid patents, such machine tools being adapted to perform various operations on relatively small work pieces, such as the work piece WP1, FIG. 5A, which is of rectangular contour and which is to have an opening 11, FIG. 5B, drilled or tapped therein.

Such work pieces are gravity-fed to the work station WS, FIG. 1, of the machine tool, and in accomplishing such feeding resort is had to a vertically disposed magazine 12 having a guide slot 13 therein in which the work pieces are disposed, one atop another.

The magazine 12 is aligned with a second magazine 15 defined by a pair of spaced, adjustable guide plates 16 and 17, these plates being so spaced as to present a vertical slot 18 between the adjacent inner vertical edges thereof and enabling the flow of work pieces to be observed. The rear of each plate 16 and 17 is machined or otherwise provided with spaced vertical edges 16A and 17A spaced from one another a distance corresponding to the guide slot 13. Thus, the spacing between the guide edges 16A and 17A is such as to afford in effect a guide slot 20 which is a continuation of the guide slot 13, and the lower end of the guide slot 20 opens into and communicates with the work station WS, whereby the bottom-most work piece as WP1, FIG. 5A, in the magazine 15 will be at the work station in position to have the intended machining operation performed thereon.

The present machine includes a movable jaw 25 which is fixed to a reciprocal jaw holder 26, FIG. 2, located at one side of the magazine 15. The jaw holder 26 may be operated and controlled in accordance with the disclosure in my patents, whereby the jaw 25 will be reciprocated between a supporting position and a releasing position relative to the work station WS. In the supporting position, FIGS. 1 and 5A, the jaw 25 serves to support and locate the work piece as WP1 in position to have the desired operation performed thereon. In its releasing position, FIG. 5B, the jaw 25 is effective to allow the finished work piece to escape from the work station, and as the jaw 25 moves to the right from its releasing position toward its supporting position, FIG. 5C, the finished work piece WP1 is delivered from the machine, and the next work piece WP2 is eased into final or working position at the work station.

Thus, the jaw 25 is so configured as to present, at the upper side thereof, an indented support shoulder 30, FIGS. 1 and 4, which shoulder is presented to the lower end of the bottommost work piece in the magazine 15, the work piece WP1, FIG. 5A. While the parts are in the position shown in FIG. 5A, the reciprocating tool of the machine, such as a drill or tap, performs the intended operation, such as formation of the opening 11. In this regard, it will be noted, FIG. 1, that the guideway, at the work station, is formed with a recess or throat TR for the tool and which also enables chips from machining to be removed.

The jaw 25, at one side of the shoulder 30, is provided with a release gate in the form of a straight-through slot 33, and this slot is so dimensioned as to enable the finished work piece at the work station to be received therein. The gate 33, running straight through the jaw as it does, necessarily has the upper end portion communicating throughout with the shoulder 30 at the level of the shoulder so that a work piece can move off the shoulder right into and downward in the gate 33, FIG. 5B. A locator or stop 35 is arranged in fixed position below the jaw 25, and is aligned with the work station and the guide slot 20 in the magazine 15. Thus, when the jaw 25 is reciprocated to the left, moving from the position illustrated in FIG. 5A to the position illustrated in FIG. 5B, the gate 33 is presented to the finished work piece WP1 which slides downward therein, escaping from the work station, and reposes on the upper surface 35E of the stop 35 as shown in FIG. 5B. Simultaneously, with the escaping movement of the finished work piece, the next work piece WP2, moves downward in the magazine 15, with the lower end thereof resting on the upper end of the work piece WP1, FIG. 5B. Thus, as the jaw 25 is reciprocated from its supporting position to its releasing position, the finished work piece drops from the work station onto the support 35, and at the same time the work piece that is next to be machined slides downward in the magazine 15 toward the work station. In the next movement of the jaw, to the right from the FIG. 5B position, to the FIG. 5C position, the work piece WP1, trapped in the slot 33, is moved off the stop 35 by the jaw and is delivered from the machine tool as indicated by the "drop-out" arrow in FIG. 5C. During this course of movement of the jaw, to the right, the finished work piece to be delivered continues to support the lower end of the next work piece WP2, FIG. 5C. This prevails, as shown in FIG. 5C, at the time the finished work piece WP1 is delivered from the machine tool. The dimensioning is such that a moment later, as the jaw 25 attains its supporting position (dotted lines in FIG. 5C) the next work piece, WP2, drops onto the support shoulder 30 of the jaw 25.

It will be recognized from the foregoing that it is also possible to so configure the jaw 25 as to apply a positive holding action on the work piece to be machined. Thus, in the present instance, the jaw surface 30 serves merely as a support, but is indented in the top surface of the jaw so that the shoulder 30A, FIG. 5A, can be so located adjacent the throat TR and dimensioned as to bear forcefully on the lower left hand corner of the work piece at the work station, pressing the work piece forcefully against the opposing surface 17B of the plate 17, the latter thereby serving as a fixed jaw cooperating with the movable jaw to grip the work piece which is to be machined.

Hence, while I have illustrated and described a preferred embodiment of my invention, it is to be understood that this is capable of variation and modification.

I claim:

1. In a machine tool where work pieces are fed one by one to a work station and are there machined, apparatus including means affording a vertical guideway in which work pieces are to be placed to be fed to the work station, the work station whereat the machining operation is performed being within said guideway and defined in part by a throat in said means, a reciprocating jaw at the work station movable along a horizontal path between a work piece supporting position and a work piece releasing position, the work piece releasing position being located to one side of said guideway, said jaw having a horizontal shoulder at the upper side thereof normally aligned with the work station in the at-rest supporting position of the jaw and serving as a support for the work piece to be worked on, a vertically oriented slot affording a straight-through open gate in the jaw and having a transverse end portion communicating throughout with said shoulder at the level of the shoulder to enable a work piece to move off the shoulder into said gate, said gate being aligned with the guideway only when the jaw is moved to its releasing position and effective to thereupon allow the finished work piece to move from the work station into said gate, said shoulder being indented in the top surface of the jaw to enable the work piece to be forcefully held, said shoulder being adjacent said throat, a stop spaced below the gate and at one side of the guideway and in alignment with the gate only when the jaw is shifted to its releasing position so as to support one end of a released work piece located in the gate, whereby upon movement of the jaw from its work piece supporting position to its releasing position the finished work piece in the gate is released to drop by gravity onto said stop and the next work piece in the guideway simultaneously drops by gravity to engage the top of the released work piece reposing on said stop, and said gate slot and stop being so spaced and dimensioned relative to said shoulder that during movement of the jaw from its releasing to its supporting position the released work piece is moved off the stop after the shoulder is presented to the new work piece.

References Cited

UNITED STATES PATENTS

| 1,487,365 | 3/1924 | Stimpson | 221—264 |
| 3,008,216 | 11/1961 | White et al. | 221—268 X |
| 3,163,324 | 12/1964 | Lupo | 221—278 X |
| 3,266,667 | 8/1966 | MacDonald | 221—278 |
| 3,275,191 | 9/1966 | MacDonald | 221—264 |
| 3,292,819 | 12/1966 | Ford | 221—264 |

WALTER SOBIN, *Primary Examiner.*